June 4, 1935.     H. R. WIDEN     2,003,765
SOUND ACTUATED DEVICE
Filed Aug. 31, 1932
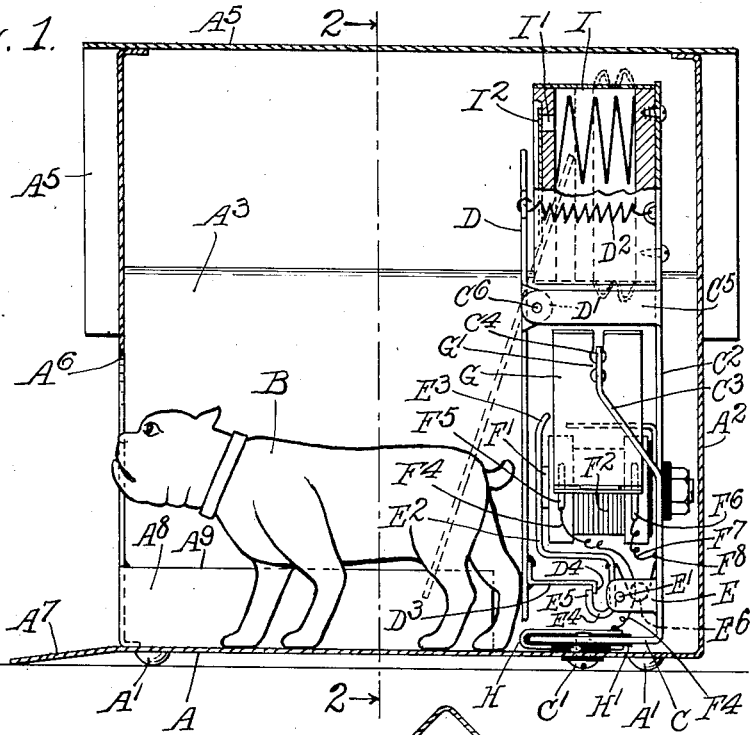
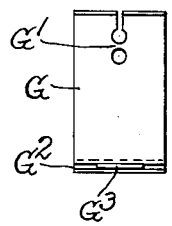
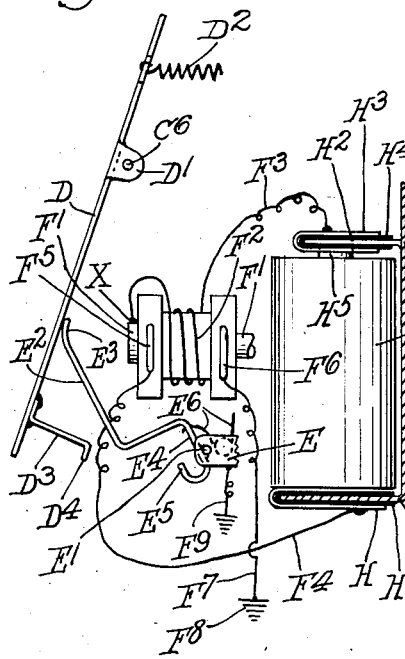
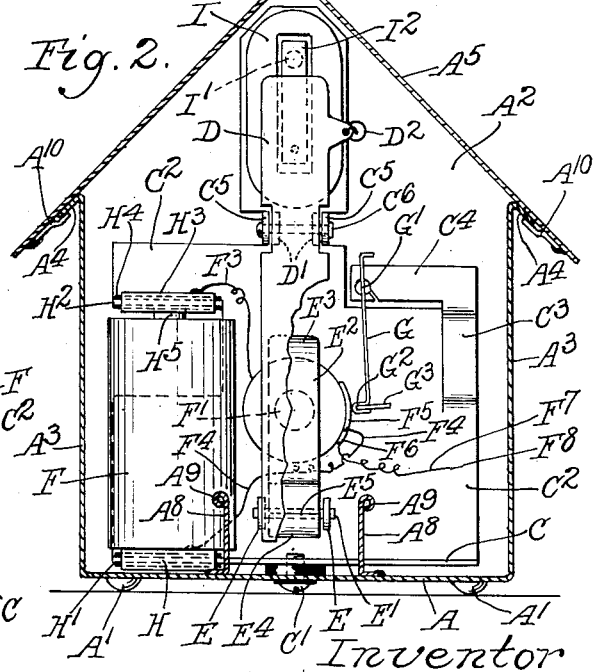
Inventor
Henry R. Widen
by Parker + Carter
Attorneys Patented June 4, 1935

2,003,765

UNITED STATES PATENT OFFICE 2,003,765

SOUND ACTUATED DEVICE

Henry R. Widen, Chicago, Ill., assignor of one-half to Charles E. Botenstein, Chicago, Ill.

Application August 31, 1932, Serial No. 631,114

7 Claims. (Cl. 46—40)

This invention relates to a toy, particularly to a motion and noise making toy.

It has for one object to provide a device whose action is initiated by sound and which, upon being actuated or released for action, will effect a plurality of movements or operate a plurality of devices.

Another object of the invention is to provide means actuated by sound, for operating a sound-making device. Another object is to provide means actuated by sound, for initiating the movement of motion-causing and sound-making means.

Other objects will appear from time to time in the specification and claims.

The invention is illustrated more or less diagrammatically in the accompanying drawing, wherein:—

Figure 1 is a vertical sectional view through one form of the device;

Figure 2 is a transverse vertical sectional view, taken at line 2—2 of Figure 1;

Figure 3 is a diagrammatic detail view of a portion of the operating mechanism;

Figure 4 is an elevational detail of the circuit breaker.

Like parts are designated by like characters throughout the specification and drawing.

The device may be enclosed in a housing and in the form illustrated herewith the housing is generally given the shape of a dog kennel or small house. It has a bottom portion A, which may be provided with feet $A^1$, a rear wall $A^2$, side walls $A^3$, preferably downwardly bent as at $A^4$, and it may have a roof $A^5$. At its forward end an opening $A^6$ is left to serve as a door. Leading downward from the door an inclined extension $A^7$ may be provided. In the form illustrated herewith the device is intended to include an animal figure and sound control means for projecting it from the housing. For this purpose guide members $A^8$ $A^8$ are provided. They may be of any suitable design or arrangement. As shown they are secured to the bottom of the housing and provided with rounded or turned upper edges $A^9$.

B indicates an animal figure, in the present case a dog, although any other device might be actuated and moved.

The operating mechanism is formed separately from the housing and its operation is the same, whether or not it is enclosed within a housing. It includes a base portion C, fastened to the housing by a screw $C^1$ or otherwise, but insulated from the housing. $C^2$ is an upwardly extending frame or support member which carries the operating mechanism proper. At one side it may have an inwardly bent bracket member $C^3$ which serves as a support for a circuit breaker, as will be described below. The member $C^3$ includes a generally horizontally extending arm $C^4$ upon which the circuit breaker is supported. The member $C^2$ is provided with a pair of forwardly extending ears $C^5$ $C^5$, within which a pin or bearing member $C^6$ is positioned.

An actuator or impeller D is provided with a pair of rearwardly extending ears $D^1$, which engage the pin $C^6$ mounted between the ears $C^5$, as shown particularly in Figures 1 and 2. The ears $D^1$ are of such size that they may fit freely between the ears $C^5$. The impeller D may carry adjacent its upper end a spring $D^2$ which is fastened one end to it and the other end to the member $C^2$, so that when the spring is free to act, it will move the impeller from the full line position of Figure 1, to the dotted line position of that figure. Adjacent its lower end the impeller D may carry a latch member $D^3$ having a downwardly bent or hook portion $D^4$.

Preferably integral with the member $C^2$ and formed from or attached to it, is a pair of ears E, within which a pin $E^1$ is positioned. Mounted to move upon the pin $E^1$ is a trigger $E^2$ having a curved impeller contacting end $E^3$ and a lower bent end $E^4$ which terminates in a hook-like portion $E^5$ adapted to engage the latch member $D^4$. A spring $E^6$ tends to throw the trigger into the position shown in Figure 3, when it is free to act.

F is a battery or any other suitable source of electric current. $F^1$ is an electro-conductive core member surrounded by an electro-magnetic coil $F^2$. It will be noticed from Figures 1 and 2 that the electro-magnet is positioned in line with the impeller D. A wire $F^3$ leads from one pole of the battery to the coil and is attached to the core as at X. A second wire $F^4$ leads from the opposite pole of the battery to a contact $F^5$, not attached to the coil. A second or co-operating contact $F^6$ is connected by a wire $F^7$ which is grounded as at $F^8$ on the frame $C^2$. The contact $F^6$ is not attached to the coil wire. By means of the connection $F^9$ the ears E which support the trigger $E^2$ are grounded on the frame $C^2$. They may, of course, be directly grounded upon it themselves or they may be grounded upon the frame by a wire or other connection such as the member $F^9$.

G is a circuit breaking and making member loosely pivoted as at $G^1$ upon the arm $C^4$ and provided with a contact portion $G^2$ which may make contact with the members $F^5$ and $F^6$. It may be provided with a weight or counterbalancing portion $G^3$.

The battery mounting may be of any suitable sort, but for convenience in removal there is shown a fitting to receive the lower end of the battery member H which is fitted and may be sprung over the base portion C and is insulated from it by an insulation $H^1$. It is to this member H that one end of the wire $F^4$ is attached. The lower end of the battery, which for convenience may be an ordinary flashlight cell, makes contact with the upper portion of the member H. To receive the upper end of the battery a flange or lug $H^2$ may be attached to or formed integral with the frame $C^2$ and a contact member $H^3$ is positioned about it and insulated from it by insulation $H^4$. It is to the upper portion of the member $H^3$ that the wire $F^3$ is attached. The lower portion of the member $H^3$ which lies below the flange or lug $H^2$ may be perforated, indented or otherwise shaped to receive the contact portion $H^5$, upon the upper end of the flashlight battery.

As a means for producing sound, one convenient mechanism is a bellows, which may be compressed or expanded by the mechanism of the device. In the particular form here shown a bellows I is mounted between the frame $C^2$ and the upper end of the impeller D. It is provided with an opening $I^1$ across or adjacent which a reed $I^2$ is mounted so that the passage of air either out or into the bellows acts upon the reed to produce vibration and sound.

It will be realized that whereas I have herewith shown and described a practical operative device, nevertheless many changes might be made in the size, shape, number and disposition of parts without departing from the spirit of my invention and I wish, therefore, that my showing be taken as in a sense diagrammatic.

The roof $A^5$, as shown, is removable, being provided with members which engage outwardly turned flanges on the walls of the house, so that the roof may slide off or onto the house. Obviously the roof might be permanently fixed on the house or it might be made attachable and removable in one of a variety of ways.

The use and operation of the electric circuit will first be described. The parts as shown in Figure 3 are in an inoperative position. The magnet is not energized, the triggers are not set, and the circuit is broken because the trigger $E^2$ is out of contact with the core $F^1$ of the magnet. The parts have been moved into this position by the spring $D^2$ upon the breaking of the circuit and the demagnetizing of the magnet.

To move the parts into operative position the trigger $E^2$ is moved into contact with the core $F^1$ and the impeller D is moved so that its hook member $D^4$ engages the hook portion $E^5$ of the trigger. The parts thus occupy the position shown in full lines in Figure 1. In that position the circuit is as follows: From one pole $H^5$ of the battery, through the wire $F^3$, about the coil to the core $F^1$, through the trigger $E^2$ to the ground, through the wire $F^7$ to contact $F^6$ across the circuit breaker G to contact $F^5$ and through the wire $F^4$ to the opposite pole of the battery. There are thus in this circuit in effect two circuit breakers or interrupters, the circuit breaker G, which is responsive to sounds, and by the vibration of sounds may be vibrated out of contact with one or the other of the contacts $F^5$, $F^6$, and the trigger $E^2$, which serves also as a circuit breaker. This latter is made necessary to prevent running down the battery when the device is not in use.

With the parts in the position shown in Figure 1, in full lines, the bellows is inflated, the dog is in position, the circuit is complete. If now a sound of sufficient strength reaches the balanced circuit breaker G, it will vibrate out of contact with one of the contacts $F^5$ or $F^6$, thus breaking the circuit and permitting the magnet to be demagnetized. The spring $E^6$ tends to throw the trigger into the position shown in Figure 3. The spring $D^2$ tends to pull the impeller into the position shown in Figure 3, which position is also shown in dotted lines in Figure 1. When this motion occurs, the bellows is depressed, a blast of air is forced against the reed and a sound is emitted. The dog will be ejected by the movement of the impeller. As soon as the vibrations which move the circuit breaker G are stopped, it will presumably return to contact with the members $F^5$ and $F^6$, and would complete the circuit and re-energize the magnet except for the fact that the trigger $E^2$ is no longer in contact with the core $F^1$ and consequently the circuit will remain broken even though the breaker G regains contact with the members $F^5$ and $F^6$, until the entire apparatus is reset, when the trigger $E^2$ is brought again into contact with the core $F^1$ to complete the circuit to cause the magnet to be re-energized.

It will be seen, therefore, that there are provided two circuit breakers, one responsive to vibration and sound, which causes the initial breaking of the circuit when the device is operated, and the other mechanically actuated when the circuit is first broken, and acting thereafter in effect as a safety circuit breaker, so that the system as a whole cannot remain for long periods active, with the magnet energized and the battery being unnecessarily run down, used up or exhausted.

I claim:

1. In combination, an impeller movably mounted and means adapted to move it, when free to do so, means for holding the impeller against movement and for releasing it, and a sound producing device operatively associated with the impeller and adapted to be mechanically actuated by the said impeller to produce a sound.

2. In combination, an impeller movably mounted and means adapted to move it, when free to do so, means for holding the impeller against movement and for releasing it, in response to sound wave vibrations, and a sound producing device operatively associated with the impeller and adapted to be mechanically actuated by said impeller to produce a sound.

3. In combination, an impeller movably mounted and means adapted to move it, when free to do so, means for holding the impeller against movement and for releasing it, in response to sound wave vibrations, and a sound producing device complete in itself directly in contact with the impeller and adapted to be mechanically actuated by movement of the impeller to produce a sound.

4. In combination, a toy animal and means for projecting it comprising an actuator movably mounted and means adapted to move it forcibly when free to do so, means for holding the actuator against movement and for releasing it in response to sound wave vibrations, and a sound producing device complete in itself mounted to be driven directly by the actuator and adapted to be actuated by movement of the actuator to produce a sound.

5. In combination in a toy, a housing, a toy animal adapted to be inserted therein and to be projected therefrom, and projecting means therefor, comprising an actuator movably mounted and means adapted to move it when free to do so, electro-magnetic means for holding the actuator against movement and for releasing it by breaking the electro-magnetic circuit, in response to sound wave vibrations, and a sound producing device complete in itself mounted to be driven by the actuator and adapted to be actuated to produce a sound.

6. In combination in a toy, a housing, a toy animal adapted to be inserted therein and to be projected therefrom, and projecting means therefor, comprising an electro-magnetic circuit, a sound-operated circuit breaker therefor, adapted to be moved by sound to break the circuit and thus to demagnetize the magnet, an impeller movably mounted adjacent the magnet, adapted when the magnet is magnetized to be held thereby, means adapted to move the impeller away from the magnet when free to do so, a reed actuator and a sound producing reed, arranged adjacent the impeller, whereby when the impeller is moved to the magnet, the reed actuator is acted upon and when the impeller moves from the magnet the reed actuator is acted upon and the reed actuated to emit a sound.

7. In combination in a toy, a housing, a toy animal adapted to be inserted therein and to be projected therefrom, and projecting means therefor, comprising an actuator movably mounted and means adapted to move it forcibly when free to do so, means for holding the actuator against movement and for releasing it in response to sound wave vibrations, and a sound producing device complete in itself in contact with the actuator and adapted to be actuated by movement of the actuator to produce a sound, said toy animal positioned adjacent the actuator and arranged to be projected by the actuator as the latter moves.

HENRY R. WIDEN.